United States Patent [19]

Bötcher et al.

[11] Patent Number: 4,551,297

[45] Date of Patent: Nov. 5, 1985

[54] METHOD OF MAKING AN EMBOSSING CYLINDER

[75] Inventors: Hugo Bötcher, Hanover; Klaus Heimrich, Garbsen; Gustav Hildebrandt, Auetal; Heinrich Kracke, Lehrte; Johannes Richter, Celle, all of Fed. Rep. of Germany

[73] Assignee: J. H. Benecke GmbH, Fed. Rep. of Germany

[21] Appl. No.: 646,126

[22] Filed: Aug. 31, 1984

[30] Foreign Application Priority Data

Sep. 14, 1983 [DE] Fed. Rep. of Germany ....... 3333179
Feb. 20, 1984 [DE] Fed. Rep. of Germany ....... 3405985

[51] Int. Cl.⁴ .............................................. B29C 1/02
[52] U.S. Cl. ..................... 264/224; 264/225; 264/227; 264/284; 425/385
[58] Field of Search ............... 264/227, 226, 225, 224, 264/220, 219, 284; 425/385

[56] References Cited

U.S. PATENT DOCUMENTS

| | | | |
|---|---|---|---|
| 2,342,556 | 2/1944 | Rockoff | 264/219 |
| 3,015,640 | 1/1962 | Weaver et al. | 264/76 |
| 3,081,495 | 3/1963 | Kovatch | 264/220 |
| 3,914,369 | 10/1975 | Modic et al. | 264/225 |
| 3,917,786 | 11/1975 | Weigert | 264/227 |
| 4,250,135 | 2/1981 | Orsini | 264/227 |
| 4,283,240 | 8/1981 | Speer | 264/225 |

*Primary Examiner*—Donald Czaja
*Assistant Examiner*—MaryLynn Fertig
*Attorney, Agent, or Firm*—Allegretti, Newitt, Witcoff & McAndrews, Ltd.

[57] ABSTRACT

A method for producing the matrix for the embossing cylinder which has a uniform pattern design in the marginal areas adjoining the abutment where the ends of the blanket are joined to form the tube comprising (1) casting liquid silicone rubber on a sheet of leather having the desired grain and vulcanizing the silicone, (2) using the matrix thus formed to emboss, under heat and pressure in a press, a rectangular sheet of thermoplastic resin such as polyvinyl chloride film, (3) forming the embossed sheet into a tube, (4) placing the portion of the tube having abutting edges in a narrow platen press and reembossing the area surrounding the abutment with the silicone rubber matrix to mask the impression of the joint and provide a continuous uninterrupted pattern, and (5) using the positively-embossed thermoplastic sheet as a matrix for casting vulcanizable silicone rubber to form a negatively-embossed matrix for use as a blanket on an embossing roll. The embossing roll is used to produce continuous lengths of embossed thermoplastic film with a continuous, uninterrupted grain pattern.

11 Claims, No Drawings

METHOD OF MAKING AN EMBOSSING CYLINDER

The invention concerns a method for the continuous embossing of the surface of a thermoplastic film to impart a leather grain thereto. It also relates to a method for the production of an embossing cylinder having a grain design for the production of a plastic film with a grain simulating natural leather.

A known device of the kind in question has an embossing cylinder whose embossing surface is provided artificially, e.g., by mechanical treatment, with an embossing form. The thermoplastic film embossed with it has a correspondingly artificial appearance.

The objective of the invention is to provide a thermoplastic film, especially in a continuous process, with a natural-looking embossing. It is also the objective of the invention to provide a method by which an embossing cylinder for the leather-like sheet to be created can be simply produced without discontinuities appearing in the natural embossing impression or design. Finally, it is the objective of the invention to provide a method that makes possible the production of a synthetic film made of a wide range of materials with a natural leather grain in a simple and inexpensive manner.

According to the invention, the embossing portion of the cylinder consists of silicone rubber. The use of silicone rubber has the advantage that extremely complicated embossing patterns can be used, even in the imitation of leather pores or individual hairs. The embossing impression can be produced in the silicone rubber quite simply in a known manner by applying the silicone rubber to the natural leather, vulcanizing it, and then peeling it off.

A difficult problem arises with the use of a natural leather surface as a starting form due to the fact that this leather surface does not exist in the continuous form, since hides do not exist in continuous lengths. Thus, basically an embossing layer is produced, e.g., in the form of a long rectangle. If the rectangular layer is formed into a tube, then there is a discontinuity at the abutting edges which produces at spaced intervals unsightly lines or breaks in the design when a continuous length of thermoplastic film is embossed with such a tubular matrix.

The essence of the invention consists in overcoming this discontinuity problem in order to make possible a continuous length of plastic film in great quantities. To this end, the invention provides for first of all creating a positive impression on an intermediate discontinuous matrix or mold of limited length by the embossing of a thermoplastic film. Although discontinuous in its surface impression, the film has the advantageous property of being capable of being deformed by thermoplastic embossing. According to the invention, the area of the positive impression on the film in which the discontinuity becomes noticeable, is overembossed or reembossed by the negative impression of the matrix or mold so that the discontinuity disappears. Since in the overembossing, the thermoplastic film in the area of the abutting edges also reaches the temperature necessary for welding, the abutting edges are at the same time welded to each other.

Since the overembossing is limited to the margins adjacent the abutting edges, there develops a transition area in which the overembossed impression melds into the impression or design originally embossed with the matrix. This transition, however, is so continuous that it is practically no longer visible.

The embossing of the thermoplastic film with the matrix can be done in a simple manner in a flat press, although in principle, the embossing in a cylinder press is not excluded. The overembossing of the thermoplastic film with the matrix can be done in a flat press with narrow platens so that the overembossing takes place only in the area of the abutting edges. The press width in this case is enlarged advantageously in the circumferential direction of the tube towards the sides of the press platens in order to obtain an extended continuous transition from the overembossing to the original embossing.

For the production of the cast, silicone matrix or mold, it is useful for the tube to be applied to a cylinder with the positive impression toward the outside, the cylinder to be continuously rotated and the coating of silicone rubber to be spread on with a blade and then vulcanized into the matrix. The thickness of the matrix is thus rendered particularly uniform and the application with the blade assures good penetration of the silicone rubber into the pores of the positive pattern.

In order to mask the transition between the embossing and the overembossing by the matrix, even in the case of difficult embossing structures, it is advantageous if the edges of the press platens of the flat press used for the overembossing are curved in an axial direction in a serpentine fashion, preferably irregularly.

Instead of a natural leather surface, of course, any other kind of surface pattern can serve as a base, e.g., a fabric, non-woven material, a wood surface, or the like.

The basic idea of the invention also makes possible a similar method for the production of a synthetic film. This form of the invention rests on the basic idea that if it is possible by using the basic theory of the invention to create long film web with natural leather grain continuously over the length of the web in positive form, it is also possible to take a negative from the web by pouring silicone rubber onto it, so that then a negative with natural leather grain running continuously over the web length is available. The rubber negative thus produces does not require an embossing operation for the production of the final positive grain, but makes possible use of the known casting and spreading method. Continuity of the procedure can likewise by achieved by having the thermoplastic film with the leather grain in positive form connected endlessly, and the connections are overembossed, making it invisible. Advantageous forms of the execution of the continuous embossing of the thermoplastic film are given in the following examples.

EXAMPLE 1

For the production of an embossing cylinder for the continuous embossing of a thermoplastic film, first a pattern of natural leather, textile, or the like is stretched on a level support and fastened on the edges. A frame-like boundary is put around the edges, thus forming a mold into which an antiadherent silicone rubber is poured. This adjusts itself to the surface form of the pattern in every smallest detail, penetrating into pores and even surrounding hairs. Then the silicone rubber is hardened by vulcanizing, gelatinizing, or other suitable methods, and peeled off the pattern. This process is repeated several times to produce several matrices. They each have a thickness of 3–4 mm and are connected to each other on the back side with adhesive tape.

The thus produced structure consisting of several matrices is put into a platen press together with a thermoplastic film with a thickness of about 0.8 mm, with the thermoplastic film on the bottom and the embossing matrix on top of it, embossed side down.

The thermoplastic film is then heated directly from below and additionally also from above through the matrix to about 190° C., and therby softened. The temperature is at least 150° C. and preferably between 180° and 250° C. Under accompanying pressure, after a certain length of time, the exact replica of the structure of the matrix is produced on the thermoplastic film, which consists, e.g., of polyvinyl chloride plasticized with a high polymer, a straight line long chain alcohol, a plastifying polymer or a combination of these. Then cooling takes place and the embossed thermoplastic film is removed.

The thermoplastic film is cut to fit the length and circumference of an embossing cylinder and formed into a tube with the embossed or grain side out. The abutting edges are carefully fitted together and joined on the back side with adhesive tape. Then the tube is placed in a platen press with the abutting area between the narrow platens and the matrix laid over the abutting area. The thermoplastic film may have a cover layer the viscosity of which, at embossing temperature, is lower than that of the thermoplastic film. Under heat and pressure, the desired overembossing takes place in the area of the abutment. At the same time, the abutting edges are welded together and, if used, the cover layer is united to the thermoplastic film.

The tube, thus produced, having on its outer side a positive of the embossing structure, is drawn onto a cylinder, and the latter is placed in a frame with bearings and continuously rotated. Then by means of a spreader blade, silicone rubber is applied in a coating of uniform thickness and vulcanized. The cylinder is kept rotating during these operations in order to prevent irregularities in the coating thickness.

After the vulcanization, the silicone tube produced is removed and turned inside out so that the design taken from the pattern, leather, textile, or the like is present in the negative form on the outer surface.

The tube is drawn over a cylinder, after its surface has been coated with an adhesive agent and a silicone adhesive. After setting of the adhesive layer, the cylinder can be used as an embossing cylinder in a device for the continuous embossing of a thermoplastic film.

EXAMPLE 2

For the production of a plastic film with a grain, first a thermoplastic film is continuously embossed using an embossing cylinder produced in accordance with Example 1, and a long section of it connected together in an endless loop, with the joint location being overembossed with the embossing cylinder so that a continuous transition of the positive embossing pattern is produced.

Then silicone rubber is poured or spread onto the side of the endless thermoplastic film that bears the positive embossing pattern, and at the same time, a fabric or textile web is applied. The silicone rubber is vulcanized, gelatinized, or solidified, and drawn off the pattern, so that an endless band of silicone rubber is formed that the desired surface impression, especially a natural leather grain.

This endless silicone rubber strip is put into a device in which it rotates slowly and continuously. Liquid plastic is applied to the surface having the grain in negative form, hardened and then peeled off and wound up.

We claim:
1. A method for making an embossing cylinder having a silicone rubber surface with a negative impression of grain design which comprises
   (a) providing a sheet of natural leather having the desired grain design,
   (b) pouring liquid vulcanizable silicone rubber on to the grained surface to form a uniformly thick coating,
   (c) vulcanizing the silicone rubber to provide an embossing matrix having an accurate negative impression of said grain design,
   (d) stripping said embossing matrix from said leather sheet,
   (e) laying a thermoplastic film, having opposed parallel edges, on the grained surface of said matrix and subjecting the film to heat and pressure to form a positive impression on the surface,
   (f) stripping the film from the matrix and forming it into a tube with the embossed surface on the outside and said parallel edges abutting,
   (g) placing said embossing matrix over said abutting edges and the marginal area on either side thereof,
   (h) subjecting the film beneath said matrix to heat and pressure to overemboss the previously embossed surface in said marginal areas,
   (i) pouring vulcanized silicone rubber on the embossed surface to form a uniformly thick blanket,
   (j) vulcanizing the silicone rubber blanket,
   (k) stripping the blanket from the embossed surface, and
   (l) adhering the blanket, embossed side out, to the surface of a cylinder.

2. The method of claim 1 in which said embossing of the thermoplastic film in steps (e) and (h) is effected in a press with flat platens.

3. The method of claim 1 in which said overembossing of the thermoplastic film in the marginal area is effected in a press with narrow, slightly-curved platens.

4. The method of claim 3 in which the embossing area of said pressing platens continuously increases in the circumferential direction of the tube toward the opposed edges of the pressing platens.

5. The method of claim 1 in which the tube of thermoplastic film, embossed side out, is connected to the outer surface of a cylinder, the cylinder continuously is rotated and the liquid vulcanizable silicone rubber is poured on the surface of the tube and then vulcanized.

6. The method of claim 1 in which the edges of said marginal area are curved, serpentine fashion.

7. The method of claim 1 which includes the step of laying a reinforcing fabric over said layer of silicone rubber before vulcanization.

8. The method of claim 1 in which the embossing is carried out at a temperature of at least 150° C., preferably between 180° C. and 250° C.

9. The method of claim 1 in which the plastic material of the thermoplastic film contains a plasticizer taken from the group consisting of a high polymer, a straight line long chain alcohol, a plastifying polymer, or a combination of these.

10. The method of claim 1 in which said thermoplastic film in step (g) has a cover layer in the area of said abutting edges, the viscosity of which at embossing temperature is lower than that of said thermoplastic film.

11. The method of claim 10 in which the cover layer is united to the thermoplastic film during embossing.

* * * * *